Figures 1, 2:
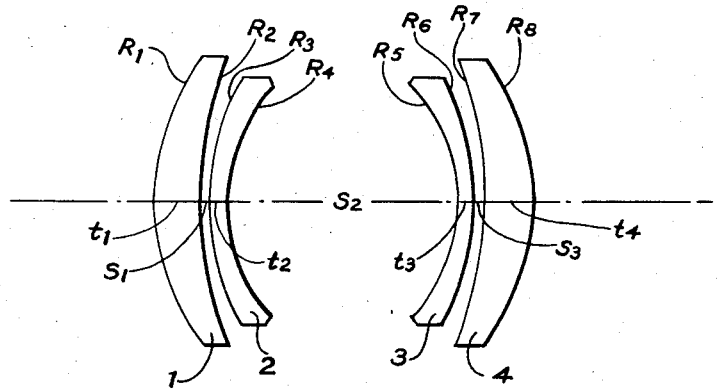

Dec. 23, 1958     M. REISS     2,865,252
WIDE FIELD OBJECTIVE COMPRISING FOUR
HIGHLY MENISCUS ELEMENTS
Filed July 12, 1956

| EF = 100 mm. | | | | f/10 |
|---|---|---|---|---|
| LENS | N | V | RADII | Thicknesses |
| 1 | 1.5887 | 60.4 | $R_1 = +14.232$ mm. | $t_1 = 3.22$ mm. |
|  |  |  | $R_2 = +26.177$ | $S_1 = 0.03$ |
| 2 | 1.6050 | 37.9 | $R_3 = +15.595$ | $t_2 = 1.33$ |
|  |  |  | $R_4 = +10.648$ | $S_2 = 14.80$ |
| 3 & 4 | SYMMETRICAL WITH 1 & 2 | | | |

Max Reiss
INVENTOR.

BY Daniel I. Mayne
Harold F. Bennett
ATTORNEY & AGENT

United States Patent Office 2,865,252
Patented Dec. 23, 1958

2,865,252

WIDE FIELD OBJECTIVE COMPRISING FOUR HIGHLY MENISCUS ELEMENTS

Max Reiss, Rochester, N. Y., assignor to Eastman Kodak Company, Rochester, N. Y., a corporation of New Jersey Application July 12, 1956, Serial No. 597,465

4 Claims. (Cl. 88—57)

This invention relates to wide field photographic objectives of the type comprising two members in axial alignment on opposite sides of a central airspace, each member consisting of a simple meniscus negative element bordering the central airspace and a simple positive meniscus element separated therefrom by a small airspace, the concave surfaces of all said elements being turned toward the central airspace.

Lenses of this type are highly developed and are widely used for process work, architectural photography and aerial reconnaissance, especially when a field of about $+30°$ or upward is to be covered with well corrected distortion. It is the general practice, well founded in lens theory, to make lenses of this type symmetrical when intended for use at low or unit magnification and to make them unsymmetrical in one or more respects when intended for photographing distant objects.

The object of the present invention is to provide a lens of this type which is highly corrected for spherical aberration, coma, chromatic aberration, distortion, curvature of field, and astigmatism and, which is made of common optical glasses which are plentifully available in large pieces so that the lenses can be produced in quantities in long focal lengths. Such glasses range from about 1.50 to about 1.63 in refractive index among the "crowns" and from about 1.55 to about 1.70 among the "flints."

I have discovered that, within these limitations of refractive indices, a better correction for zonal astigmatism and oblique spherical aberration is obtained by making the inner concave surface and the outer convex surface of both members more strongly curved than has heretofore been done and keeping the central space between the limits 0.08 F and 0.18 F where F is the focal length of the objective. For the best working of the invention the radii of curvature of the outer convex surfaces are on average between 0.12 F and 0.155 F and those of the inner concave surfaces are between 0.09 F and 0.12 F. The curvatures of the intermediate surfaces are determined in a known way by the requirements of correction of spherical aberration and color and are conveniently such that the radius of curvature of the concave surface of the positive element is between 1.4 and 2.5 times that of the convex surface thereof and the radius of curvature of the convex surface of the negative element is between 1.3 and 1.8 times that of the concave surface thereof.

At the present time, only symmetrical objectives have been made up according to the invention for use at magnifications roughly between ⅓ and 3, it being known that a symmetrical objective is inherently corrected for coma and distortion at unit magnification and is almost completely corrected for these aberrations in this indicated range. Nevertheless, it is well known in the art to make these objectives slightly unsymmetrical for use at larger magnifications by making one or more surfaces in each member different from its counterpart in the other member. In applying this method to the present invention, I prefer to keep the radius of curvature of each inner concave surface and each outer convex surface smaller than 150% of its counterpart in the other member.

The axial thickness of each of the two members is conveniently between 0.04 F and 0.15 F.

By means of these features I have designed a very highly corrected process lens which gives superior definition over a field of $\pm 30°$.

In the accompanying drawing:

Fig. 1 shows in diagrammatic axial section a symmetrical objective according to the invention, and Fig. 2 gives constructional data for one embodiment thereof.

The data given in Fig. 2 is repeated for convenience as follows:

$f = 100$ mm.   $f/10$

| Lens | N | V | Radii, mm. | Thicknesses, mm. |
|---|---|---|---|---|
| 1 | 1.5887 | 60.4 | $R_1 = +14.232$ | $t_1 = 3.22$ |
|   |        |      | $R_2 = +26.177$ | $s_1 = 0.03$ |
| 2 | 1.6050 | 37.9 | $R_3 = +15.955$ | $t_2 = 1.33$ |
|   |        |      | $R_4 = +10.643$ | $s_2 = 14.80$ |
| 3 and 4 | | | Symmetrical with 1 and 2 | |

A second example is an adaptation using a slightly different glass and has the following dimensions:

$f = 100$ mm.   $f/10$

| Lens | N | V | Radii, mm. | Thicknesses, mm. |
|---|---|---|---|---|
| 1 | 1.5880 | 61.2 | $R_1 = +14.137$ | $t_1 = 3.20$ |
|   |        |      | $R_2 = +25.389$ | $s_1 = 0.03$ |
| 2 | 1.6050 | 37.9 | $R_3 = +15.549$ | $t_2 = 1.32$ |
|   |        |      | $R_4 = +10.546$ | $s_2 = 15.32$ |
| 3 and 4 | | | Symmetrical with 1 and 2 | |

In these tables as in Fig. 2 the lens elements are numbered in the first column from front to rear, the refractive indices N for the D line of the spectrum and the conventional dispersive indices V are given in the second and third columns, and the radii of curvature R of the lens surfaces, the thicknesses $t$ of the lens elements and the spaces $s$ between the lens elements, each numbered by subscripts from front to rear, are given in the last two columns. It is understood that $R_5$, $R_6$, $R_7$, $R_8$, $t_3$, $t_4$ and $s_3$ are respectively equal to $R_4$, $R_3$, $R_2$, $R_1$, $t_2$, $t_1$ and $s_1$ on account of the symmetry of the objective, the signs of the radii being reversed.

A third example, which includes a pair of plane-parallel glass plates in the manner shown in U. S. 2,031,792 Richter, is as follows:

$f = 100$ mm.   $f/6.3$.

| Lens | N | V | Radii, mm. | Thicknesses, mm. |
|---|---|---|---|---|
| Plate | 1.5170 | 64.5 |  | $t_p = 12.48$ |
|       |        |      |  | $s_p = 0.62$ |
| 1 | 1.5887 | 60.4 | $R_1 = +14.596$ | $t_1 = 3.27$ |
|   |        |      | $R_2 = +28.426$ | $s_1 = 0.10$ |
| 2 | 1.6170 | 38.5 | $R_3 = +16.836$ | $t_2 = 1.41$ |
|   |        |      | $R_4 = +10.960$ | $s_2 = 14.11$ |

Symmetrical

These data are given in the same manner as before except that $t_p$ indicates the thickness of each plate and $s_p$ the separation thereof from the lens.

The features of the invention are summarized in the following algebraic inequalities:

$$1.50 < N_1 < 1.63$$
$$1.55 < N_2 < 1.70$$
$$1.55 < N_3 < 1.70$$
$$1.50 < N_4 < 1.63$$
$$0.24\ F < R_1 - R_8 < 0.31\ F$$
$$-0.05\ F < (R_1 + R_8) < +0.05\ F$$
$$0.18\ F < (R_4 - R_5) < 0.024\ F$$
$$-0.04\ F < (R_4 + R_5) < +0.04\ F$$
$$0.06\ F < (R_2 - R_1) < 0.22\ F$$
$$-0.06\ F < (R_7 - R_8) < -0.22\ F$$
$$0.035\ F < (R_3 - R_4) < 0.08\ F$$
$$-0.035\ F < (R_6 - R_5) < -0.08\ F$$
$$0.04\ F < (t_1 + s_1 + t_2) < 0.15\ F$$
$$0.08\ F < s_2 < 0.18\ F$$
$$0.04\ F < (t_1 + s_3 + t_4) < 0.15\ F$$

In the three examples, $R_2/R_1 = R_7/R_8 = 1.84$, 1.79 or 1.95 respectively; $R_3/R_4 = R_6/R_5 = 1.50$, 1.47, 1.54; $(t_1+s_1+t_2) = (t_3+s_3+t_4) = 0.0458\ F$, $0.0455\ F$ or $0.0468\ F$ in accordance with these features of the invention. It will be directly apparent from the tables that each example also embodies all the other features of the invention. It will be understood that $(R_1 - R_8)$ is twice the numerical average of $R_1$ and $R_8$, the negative sign being used because of the negative value of $R_8$ and likewise in the case of $(R_4 - R_5)$.

According to a somewhat simplified way of defining the invention, the radii of curvature are within the following limits:

$$0.12\ F < R_1 < 0.155\ F$$
$$0.22\ F < R_2 < 0.32\ F$$
$$0.14\ F < R_3 < 0.20\ F$$
$$0.09\ F < R_4 < 0.12\ F$$
$$0.09\ F < -R_5 < 0.12\ F$$
$$0.14\ F < -R_6 < 0.20\ F$$
$$0.22\ F < -R_7 < 0.32\ F$$
$$0.12\ F < -R_8 < 0.155\ F$$

I claim:

1. A photographic objective of the type comprising two members in axial alignment on opposite sides of a central airspace, each member consisting of a simple meniscus negative element bordering the central airspace and a simple positive meniscus element separated therefrom by a small airspace, the concave surfaces of all said elements being turned toward the central airspace, in which the refractive indices N of the lens elements, the radii of curvature R of the lens surfaces, the axial thickness $t$ of the lens elements and the axial separations $s$ of the lens elements, each numbered by subscripts in order from front to rear, are within the ranges defined by the following algebraic inequalities:

$$1.50 < N_1 < 1.63$$
$$1.55 < N_2 < 1.70$$
$$1.55 < N_3 < 1.70$$
$$1.50 < N_4 < 1.63$$
$$0.24\ F < (R_1 - R_8) < 0.31\ F$$
$$-0.05\ F < (R_1 + R_8) < +0.05\ F$$
$$0.18\ F < (R_4 - R_5) < 0.24\ F$$
$$-0.04\ F < (R_4 + R_5) < +0.04\ F$$
$$0.06\ F < (R_2 - R_1) < 0.22\ F$$
$$-0.06\ F < (R_7 - R_8) < -0.22\ F$$
$$0.03\ F < (R_3 - R_4) < 0.08\ F$$
$$-0.03\ F < (R_6 - R_5) < -0.08\ F$$
$$0.04\ F < (t_1 + s_1 + t_2) < 0.15\ F$$
$$0.08\ F < s_2 < 0.18\ F$$
$$0.04\ F < (t_3 + s_3 + t_4) < 0.15\ F$$

where F is the focal length of the objective and where the radii of curvature of surfaces convex to the front have positive values and those of surfaces concave to the front have negative values.

2. A photographic lens comprising four meniscus lens elements and having substantially the specifications given in the following table:

| Lens | N | V | Radii | Thicknesses |
|---|---|---|---|---|
| 1 | 1.59 | 60 | $R_1 = +0.14\ F$ <br> $R_2 = +0.26\ F$ | $t_1 = 0.03\ F$ <br> $s_1 > 0.01\ F$ |
| 2 | 1.60 | 38 | $R_3 = +0.16\ F$ <br> $R_4 = +0.11\ F$ | $t_2 = 0.01\ F$ <br> $s_2 = 0.15\ F$ |
| 3 | 1.60 | 38 | $R_5 = -0.11\ F$ <br> $R_6 = -0.16\ F$ | $t_3 = 0.01\ F$ <br> $s_3 > 0.01\ F$ |
| 4 | 1.59 | 60 | $R_7 = -0.26\ F$ <br> $R_8 = -0.14\ F$ | $t_4 = 0.03\ F$ | where the lens elements as numbered from front to rear are listed in the first column, the refractive indices N for the D line of the spectrum and the conventional dispersive indices V are given in the second and third columns, and the radii of curvature R of the lens surfaces, the thicknesses $t$ and the axial separations $s$ of the lens elements, each numbered by subscripts from front to rear, are given in the last two columns and where the + and − values of the radii indicate surfaces respectively convex and concave to the front and F is the focal length of the objective as a whole.

3. A photographic objective of the type comprising two members in axial alignment on opposite sides of a central airspace, each member consisting of a simple meniscus negative element bordering the central airspace and a simple positive meniscus element separated therefrom by a small airspace, the concave surfaces of all said elements being turned toward the central airspace, in which the refractive indices N of the lens elements, the radii of curvature R of the lens surfaces, the axial thicknesses $t$ of the lens elements and the axial separations $s$ of the lens elements, each numbered by subscripts in order from front to rear, are within the ranges defined by the following algebraic inequalities:

$$1.50 < N_1 < 1.63$$
$$1.55 < N_2 < 1.70$$
$$1.55 < N_3 < 1.70$$
$$1.50 < N_4 < 1.63$$
$$0.12\ F < R_1 < 0.155\ F$$
$$0.22\ F < R_2 < 0.32\ F$$
$$0.14\ F < R_3 < 0.20\ F$$
$$0.09\ F < R_4 < 0.12\ F$$
$$0.09\ F < -R_5 < 0.12\ F$$
$$0.14\ F < -R_6 < 0.20\ F$$
$$0.22\ F < -R_7 < 0.32\ F$$
$$0.12\ F < -R_8 < 0.15\ F$$
$$0.04\ F < (t_1 + s_1 + t_2) < 0.15\ F$$
$$0.08\ F < s_2 < 0.18\ F$$
$$0.04\ F < (t_3 + s_3 + t_4) < 0.155\ F$$

where F is the focal length of the objective and where the + and − values of the radii R denote surfaces respectively convex and concave to the front.

4. A wide field photographic objective comprising two members in axial alignment on opposite sides of a central airspace, each member consisting of a simple meniscus negative element bordering the central airspace and a simple positive meniscus element separated therefrom by a small airspace, the concave surface of each of said elements being turned toward the central airspace, in which the average of the radii of curvature of the outermost surfaces is between 0.12 F and 0.155 F, where F is the focal length of the objective, in which the average of the radii of curvature of the innermost surfaces is between 0.09 and 0.12 F, in which the refractive index of each negative element is between 1.55 and 1.70, and in which the length of the central airspace is between 0.08

F and 0.18 F, the remaining radii of curvature being determined by the requirements of color correction.

References Cited in the file of this patent

UNITED STATES PATENTS

| | | |
|---|---|---|
| 706,650 | Goerz | Aug. 12, 1902 |
| 2,031,792 | Richter | Feb. 25, 1936 |
| 2,116,264 | Hasselkus et al. | May 3, 1938 |
| 2,325,275 | Rayton | July 27, 1943 |
| 2,383,115 | Durrand | Aug. 21, 1945 |
| 2,518,719 | Reiss | Aug. 15, 1950 |

FOREIGN PATENTS

| | | |
|---|---|---|
| 86,614 | France | May 3, 1937 |
| 478,453 | Great Britain | June 21, 1938 |
| 478,453 | Great Britain | June 21, 1938 |